United States Patent
Meiners

(10) Patent No.: US 7,113,226 B2
(45) Date of Patent: Sep. 26, 2006

(54) METHOD FOR GENERATING A REPRESENTATION OF A PARTICULAR SIGNAL AMONG A PLURALITY OF SIGNALS REPRESENTING LINES IN A DISPLAY

(75) Inventor: Jason W. Meiners, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 477 days.

(21) Appl. No.: 10/726,872

(22) Filed: Dec. 3, 2003

(65) Prior Publication Data

US 2005/0122432 A1   Jun. 9, 2005

(51) Int. Cl.
*H04N 9/77* (2006.01)

(52) U.S. Cl. .................................. 348/663; 348/665

(58) Field of Classification Search .............. 348/663, 348/665, 670, 712, 713, 450, 708, 453, 624, 348/630; 382/167, 278, 260–265, 300; H04N 9/77, H04N 9/78, 9/64

See application file for complete search history.

(56) References Cited

U.S. PATENT DOCUMENTS 4,864,389 A * 9/1989 Faroudja et al. ............ 348/670
6,188,730 B1 * 2/2001 Ngai et al. .................. 348/453

* cited by examiner

*Primary Examiner*—Sherrie Hsia
(74) *Attorney, Agent, or Firm*—W. James Brady, III; Frederick J. Telecky, Jr.

(57) ABSTRACT

A method for generating a representation of a particular signal among video signals representing a display, the signals including a first component having a first bandwidth and a second component having a smaller second bandwidth, includes the steps of: (a) measuring first samples of the first component outside the second bandwidth for an interval in each signal; (b) measuring second samples of the second component inside the second bandwidth for the interval; (c) establishing factors based upon first samples; (d) establishing filter modes based upon second samples; (e) establishing a correlation between factors and filter modes; (f) filtering the signals using a selected filter mode; (g) identifying a selected factor according to the correlation for the selected filter mode; (h) employing the selected factor for weighted mixing of the samples to generate the representation for the time interval; and (g) repeating steps (a) through (h) until the representation is completed.

12 Claims, 5 Drawing Sheets

US 7,113,226 B2

METHOD FOR GENERATING A REPRESENTATION OF A PARTICULAR SIGNAL AMONG A PLURALITY OF SIGNALS REPRESENTING LINES IN A DISPLAY

BACKGROUND OF THE INVENTION

The present invention is directed to video signal treatment, and is especially directed to treatment of color video signals to achieve improved color separation in displays or images created using the signals.

The composite video signals often used in terrestrial and cable broadcast systems consist of three video components mixed together. A luminance component (LUMA) is at baseband and has a signal width of up to about 6 MHz (MegaHertz). Color components (U and V; CHROMA) are quadrature modulated with a subcarrier signal. U.S. standards establish the color component signals as modulated with a 3.58 MHz subcarrier. European standards (PAL) establish the color component signals modulated with a 4.43 MHz subcarrier.

Because the component signals' bandwidths overlap, crosstalk can occur when separating the component signals to their original luminance and color contributions to an image. Some solutions employ comb filters to reduce such crosstalk by vertically filtering the signal. Employing such vertical filtering to succeeding signals representing adjacent lines in an image effects temporal or time-related filtering. Such temporal filtering addresses like portions in an image appearing along a common axis in the image, generally perpendicular to the parallel lines established by the succeeding signals. Modern adaptive digital comb filters can achieve good crosstalk rejection while introducing a minimal amount of filter artifacts.

A problem occurs when comb filters operate only on the signal frequencies near the color subcarrier. Such an employment of filtering seems like a good solution because LUMA-CHROMA crosstalk can only exist in the region inside the CHROMA bandwidth. That band width is specified by standards to be about 1.3 MHz. The filters used to limit bandwidth (low pass filters limit the baseband; bandpass filters limit the composite signals) are not ideal. That is, the filters have losses as the signals approach the stopband. The losses typically amount to about 33% loss at 1.3 MHz. The portion of CHROMA that falls outside the comb filter band of operation becomes false LUMA, which is manifested in the resulting image as "dot crawl". Dot crawl is a moving pattern of dots on all horizontal color transitions.

One could design a comb filter designed to operate on the entire video frequency spectrum to eliminate dot crawl completely for horizontal color transitions. However, such a filter would cause increased artifacts on vertical LUMA transitions.

There is a need for a method for generating a representation of a particular signal among a plurality of signals representing lines in a display that avoids introducing artifacts or other manifestations of signal interference.

SUMMARY OF THE INVENTION

A method for generating a representation of a particular signal among video signals representing a display, the signals including a first component having a first bandwidth and a second component having a smaller second bandwidth, includes the steps of: (a) measuring first samples of the first component outside the second bandwidth for an interval in each signal; (b)measuring second samples of the second component inside the second bandwidth for the interval; (c) establishing factors based upon first samples; (d) establishing filter modes based upon second samples; (e) establishing a correlation between factors and filter modes; (f) filtering the signals using a selected filter mode; (g) identifying a selected factor according to the correlation for the selected filter mode; (h) employing the selected factor for weighted mixing of the samples to generate the representation for the time interval; and (g) repeating steps (a) through (h) until the representation is completed.

It is therefore an object of the present invention to provide a method for generating a representation of a particular signal among a plurality of signals representing lines in a display that avoids introducing artifacts or other manifestations of signal interference.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
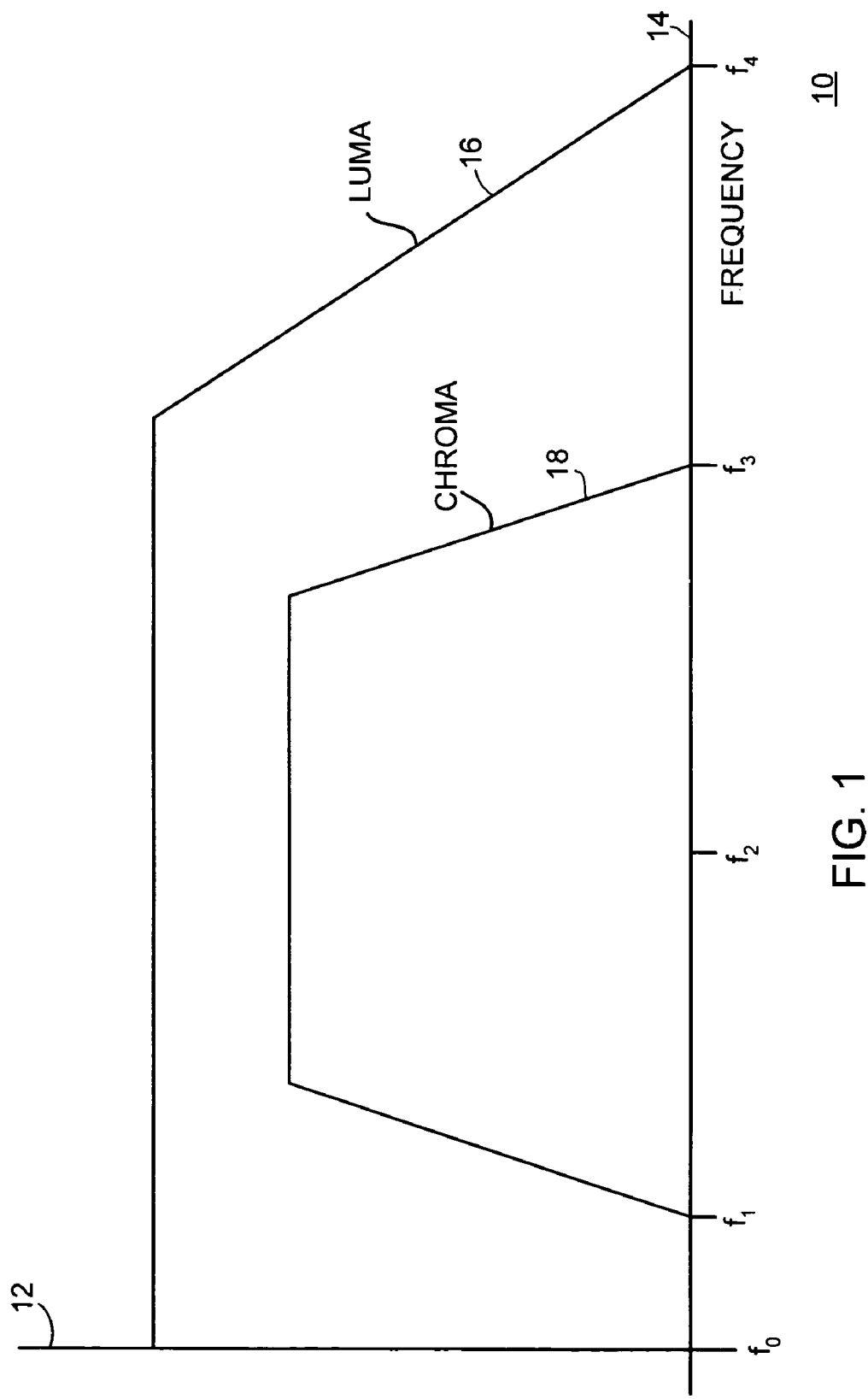
FIG. 1 illustrates components of a representative color video signal in the frequency domain.

FIG. 1 illustrates components of a representative color video signal in the frequency domain. In FIG. 1, a signal plot 10 includes a first axis 12 representing signal strength and a second axis 14 representing frequency. A first curve 16 represents the luminance component (LUMA) of a video signal. A second curve 18 represents color components 9U, V; CHROMA) of the video signal. LUMA curve 16 is at baseband and extends to a signal bandwidth from frequencies $f_0$ to $f_4$. CHROMA curve 18 has a bandwidth $f_1$–$f_3$, centered at frequency $f_2$. Thus, signals in frequency ranges $f_0$–$f_1$, $f_3$–$f_4$ are entirely LUMA component signals. Signals in frequency range $f_1$–$f_3$ contain some LUMA components and some CHROMA components.

As mentioned earlier herein, because the component signals' bandwidths overlap (e.g., as in frequency range $f_1$–$f_3$) crosstalk can occur when separating component signals 16, 18 to their original luminance (LUMA) and color (CHROMA) contributions to an image. A problem occurs when comb filters operate only on the signal frequencies around the color subcarrier center frequency $f_2$. Such an employment of filtering seems like a good solution because LUMA-CHROMA crosstalk can only exist in the region inside the CHROMA bandwidth $f_1$–$f_3$. The filters used to limit bandwidth (low pass filters limit the baseband $f_0$–$f_4$; bandpass filters limit the composite signals $f_1$–$f_3$) are not ideal. That is, the filters have losses as the signals approach the stopband ($f_1$, $f_3$, $f_4$). The portion of CHROMA signal 18 that falls outside the comb filter band of operation $f_1$–$f_3$ becomes false LUMA, which is manifested in the resulting image as "dot crawl". Dot crawl is a moving pattern of dots on all horizontal color transitions.

Figure 2:
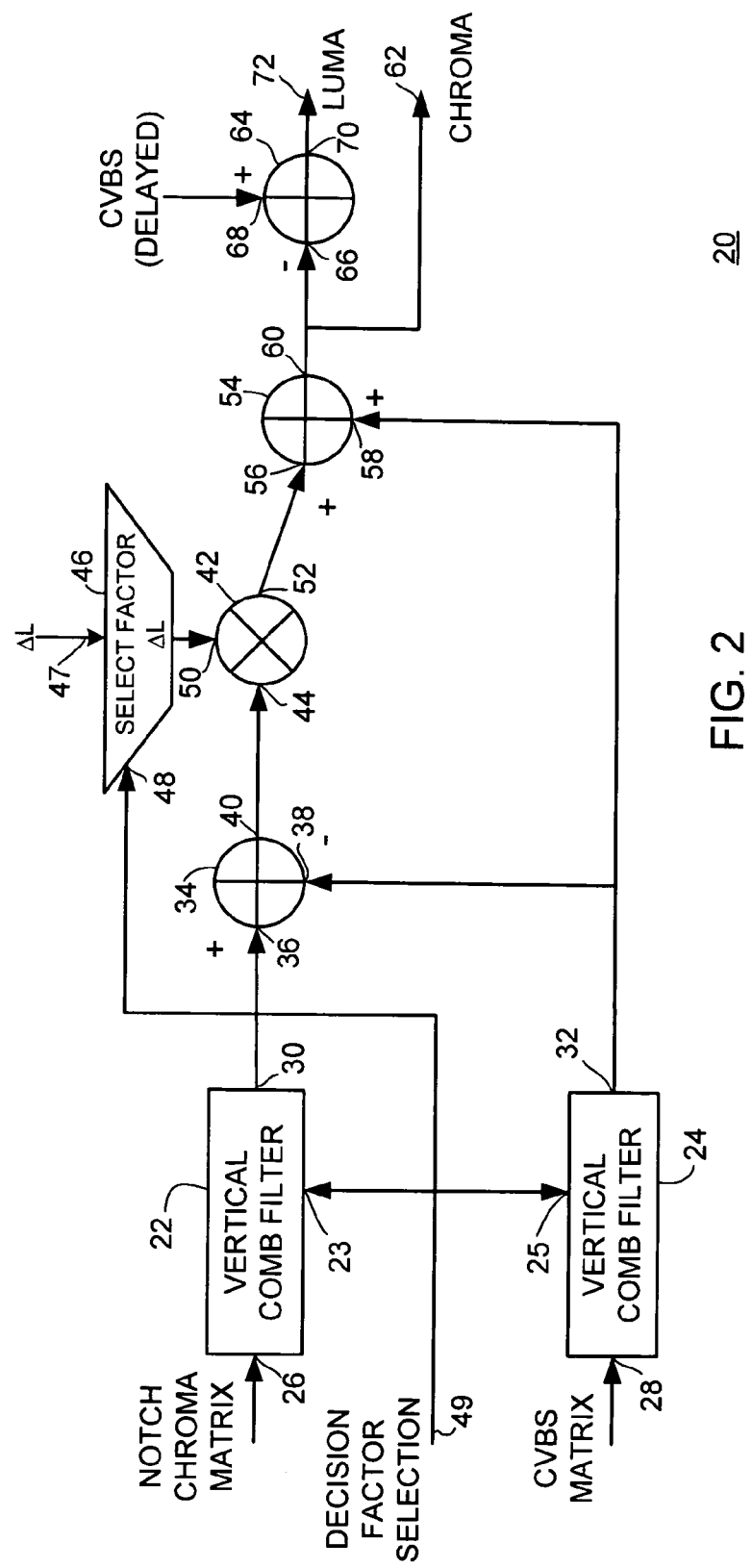
FIG. 2 is a schematic illustration of a combining apparatus for effecting weighted signal combining according to the present invention.

FIG. 2 is a schematic illustration of a combining apparatus for effecting weighted signal combining according to the present invention. In FIG. 2, a combining apparatus 20 includes a first vertical (i.e., temporal, time-related) comb filter 22 and a second vertical comb filter 24. Alternatively, comb filters 22, 24 may be embodied in a single comb matrix (not shown in FIG. 2) and operationally partitioned to assure segregation of signals. Comb filter 22 receives a matrix of filtered CHROMA signals at an input locus 26. The filtered CHROMA signals have been temporally comb-filtered within a defined CHROMA frequency range (e.g., frequency range $f_1$–$f_3$; FIG. 1). Comb filter 24 receives a matrix of non-filtered combined (i.e., LUMA and CHROMA) signal at an input locus 28. A representative number for the matrices of signals received at input loci 26, 28 is five signals. Other numbers of signals may be included in the matrices of signals received at input loci 26, 28 if desired.

Comb-filtered CHROMA signals (hereinafter referred to as "limited comb signals") are presented by comb filter 22 at an output locus 30. Comb-filtered combined (i.e., LUMA and CHROMA) signals (hereinafter referred to as "CVBS comb signals") are presented by comb filter 24 at an output locus 32. A combining unit 34 receives limited comb signals at an additive input locus 36 from output locus 30 and receives CVBS comb signals at a subtractive input locus 38 from output locus 32. Combining unit 34 subtracts CVBS comb signals at subtractive input locus 38 from limited comb signals at additive input locus 36 to present a combined comb signal at an output locus 40.

A weighting unit 42 receives combined comb signals at an input locus 44 from output locus 40. A weighting factor unit 46 receives a DECISION factor L at a decision factor input locus 47. A DECISION factor selection indicator is received at an input locus 49 and applied at a selection input locus 48 to select which weighting factor L is applied to a weighting factor input locus 50 of weighting unit 42. The DECISION factor selection indicator is also delivered to comb filter 22 at a decision input locus 23 and to comb filter 24 at a decision input locus 25. Weighting unit 42 applies a selected weighting factor L received at weighting factor input locus 50 to combined comb signals received at input locus 44 and presents a weighted combined comb signal at an output locus 52.

A combining unit 54 receives weighted combined comb signals at an additive input locus 56 from output locus 52 and receives CVBS comb signals at an additive input locus 58 from output locus 32. Combining unit 54 adds weighted combined comb signals at additive input locus 56 with CVBS comb signals at additive input locus 58 to present a CHROMA signal at an output locus 60. Output CHROMA signals are presented at an apparatus output locus 62.

A combining unit 64 receives CHROMA signals at a subtractive input locus 66 from output locus 60 and receives a delayed CVBS signal at an additive input locus 68. The delayed CVBS signal provided at input locus 68 is preferably one of the signals in CVBS matrix applied at input locus 28 to comb filter 24. By way of example and not by way of limitation, the most preferred embodiment uses the middle of the five signals comprising the CVBS matrix provided at input locus 28. Combining unit 64 subtracts CHROMA signals at subtractive input locus 66 from the delayed CVBS signal at additive input locus 68 to present a LUMA signal at an output locus 70. Output LUMA signals are presented at an apparatus output locus 72.

Combining apparatus 20 may be observed to effect the relationships represented by the expressions:

$$\text{CHROMA out} = (\text{Lim Comb} - \text{CVBS Comb}) \cdot L + \text{CVBS Comb} \quad [1]$$

Where CHROMA out=Output CHROMA (at locus 62; FIG. 2);
Lim Comb=Limited Comb Signals (at locus 30; FIG. 2);
CVBS Comb=CVBS Comb Signals (at locus 32; FIG. 2); and
L=DECISION Factor (at locus 49; FIG. 2).

and $$\text{LUMA out} = \text{Del CVBS} - \text{CHROMA out} \quad [2]$$

Where LUMA out=Output LUMA (at locus 72; FIG. 2); and
Del CVBS=Delayed CVBS Signals (at locus 68; FIG. 2).

Figure 3:
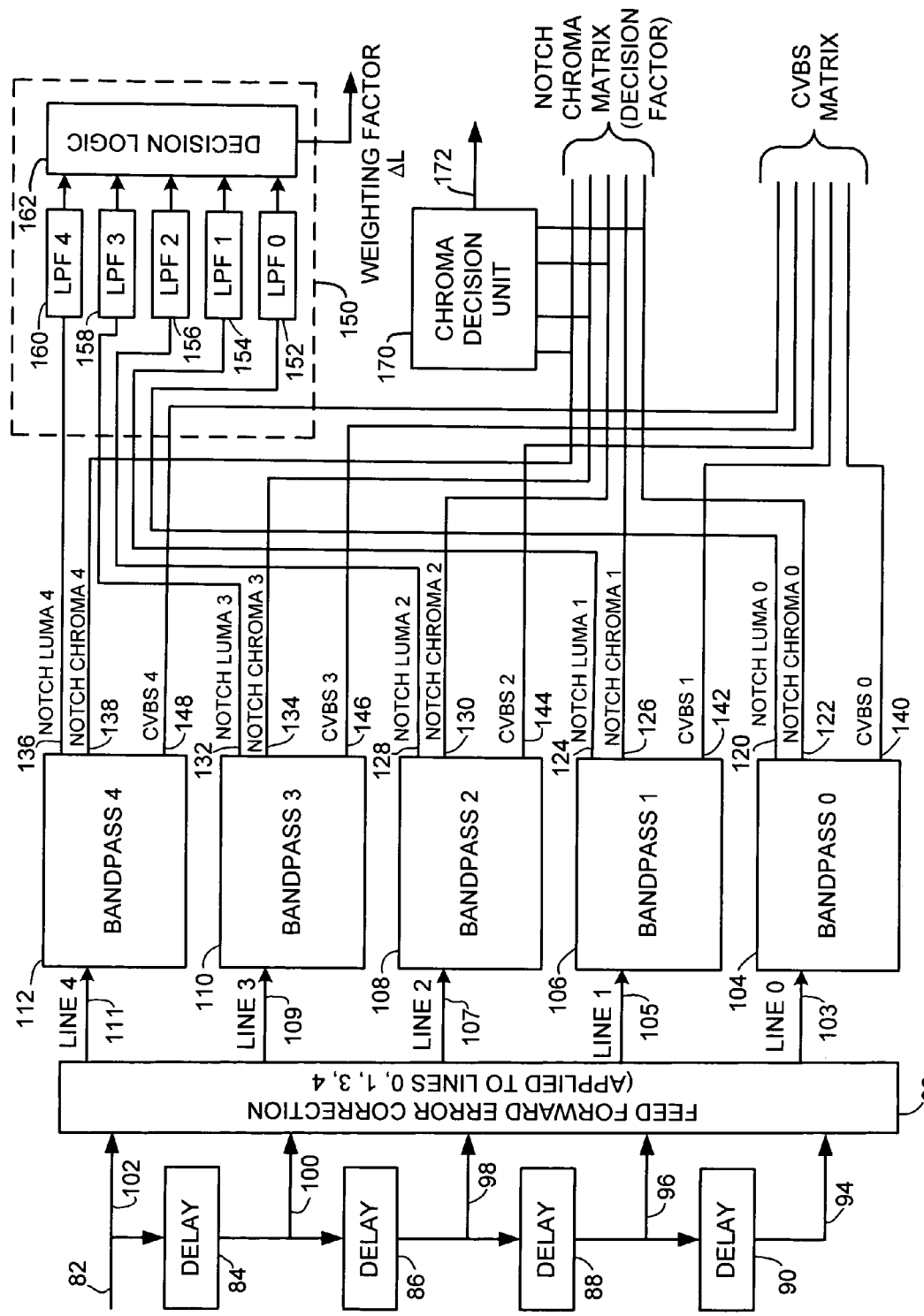
FIG. 3 is a schematic illustration of an apparatus for providing signal matrices to the combining apparatus illustrated in FIG. 2.

FIG. 3 is a schematic illustration of an apparatus for providing signal matrices to the combining apparatus illustrated in FIG. 2. In FIG. 3, a signal processing apparatus 80 receives succeeding video signals at a input locus 82. The video signals received at input locus 80 are video signal as described earlier herein in connection with FIG. 1. That is, each signal represents a line of a video or other image and contains LUMA and CHROMA components. Signal combining apparatus 80 processes a matrix of five video signals to ascertain how to adjust one signal of the five signals. Preferably, apparatus 80 receives a first signal (LINE 0) at input locus 82 and successively delays that received signal by delay units 84, 86, 88, 90 so that the first-received signal experiences four delays when it is applied to a feed forward unit 92 via an input line 94. The second video signal (LINE 1) received by apparatus 80 at input locus 82 is delayed by delay units 84, 86, 88 so that the second-received signal experiences three delays when it is applied to feed forward unit 92 via an input line 96. The third video signal (LINE 2) received by apparatus 80 at input locus 82 is delayed by delay units 84, 86 so that the third-received signal experiences three delays when it is applied to feed forward unit 92 via an input line 98. The fourth video signal (LINE 3) received by apparatus 80 at input locus 82 is delayed by delay unit 84 so that the fourth-received signal experiences one delay when it is applied to feed forward unit 92 via an input line 100. The fifth video signal (LINE 4) received by apparatus 80 at input locus 82 is not delayed when it is applied to feed forward unit 92 via an input line 102.

Signal LINE 0 is provided from feed forward unit 92 via a line 103 to a bandpass filter 104. Signal LINE 1 is provided from feed forward unit 92 via a line 105 to a bandpass filter 106. Signal LINE 2 is provided from feed forward unit 92 via a line 107 to a bandpass filter 108. Signal LINE 3 is provided from feed forward unit 92 via a line 109 to a bandpass filter 110. Signal LINE 4 is provided from feed forward unit 92 via a line 111 to a bandpass filter 112.

Bandpass filter 104 presents an output signal NOTCH LUMA 0 at an output locus 120 and presents an output signal NOTCH CHROMA 0 at an output locus 122. Signal NOTCH LUMA 0 represents the LUMA component of signal LINE 0 that is within the CHROMA bandwidth (e.g., bandwidth $f_1$–$f_3$; FIG. 1) of signal LINE 0. Signal NOTCH CHROMA 0 represents the CHROMA component of signal LINE 0 that is within the CHROMA bandwidth of signal LINE 0. Bandpass filter 104 also presents a signal CVBS 0 at an output locus 140. Signal CVBS 0 is an unfiltered representation of signal LINE 0.

Bandpass filter 106 presents an output signal NOTCH LUMA 1 at an output locus 124 and presents an output signal NOTCH CHROMA 1 at an output locus 126. Signal NOTCH LUMA 1 represents the LUMA component of signal LINE 1 that is within the CHROMA bandwidth of signal LINE 1. Signal NOTCH CHROMA 1 represents the CHROMA component of signal LINE 1 that is within the CHROMA bandwidth of signal LINE 1. Bandpass filter 106 also presents a signal CVBS 1 at an output locus 142. Signal CVBS 1 is an unfiltered representation of signal LINE 1.

Bandpass filter 108 presents an output signal NOTCH LUMA 2 at an output locus 128 and presents an output signal NOTCH CHROMA 2 at an output locus 130. Signal NOTCH LUMA 2 represents the LUMA component of signal LINE 2 that is within the CHROMA bandwidth of signal LINE 2. Signal NOTCH CHROMA 2 represents the CHROMA component of signal LINE 2 that is within the CHROMA bandwidth of signal LINE 2. Bandpass filter 108 also presents a signal CVBS 2 at an output locus 144. Signal CVBS 2 is an unfiltered representation of signal LINE 2.

Bandpass filter 110 presents an output signal NOTCH LUMA 3 at an output locus 132 and presents an output signal NOTCH CHROMA 3 at an output locus 134. Signal NOTCH LUMA 3 represents the LUMA component of signal LINE 3 that is within the CHROMA bandwidth of signal LINE 3. Signal NOTCH CHROMA 3 represents the CHROMA component of signal LINE 3 that is within the CHROMA bandwidth of signal LINE 3. Bandpass filter 110 also presents a signal CVBS 3 at an output locus 146. Signal CVBS 3 is an unfiltered representation of signal LINE 3.

Bandpass filter 112 presents an output signal NOTCH LUMA 4 at an output locus 136 and presents an output signal NOTCH CHROMA 4 at an output locus 138. Signal NOTCH LUMA 4 represents the LUMA component of signal LINE 4 that is within the CHROMA bandwidth of signal LINE 4. Signal NOTCH CHROMA 4 represents the CHROMA component of signal LINE 4 that is within the CHROMA bandwidth of signal LINE 4. Bandpass filter 112 also presents a signal CVBS 4 at an output locus 148. Signal CVBS 4 is an unfiltered representation of signal LINE 4.

All signals presented by bandpass filters 104, 106, 108, 110, 112 are appropriately respectively delayed so that they each represent aspects of vertical elements of the various lines in the display represented by signals LINE 0, LINE 1, LINE 2, LINE 3, LINE 4.

Output loci 122, 126, 130, 134, 138 are presented as the NOTCH CHROMA MATRIX input previously described as occurring at input locus 26 (FIG. 2). Output loci 122, 126, 130, 134, 138 are also provided to a Chroma Decision Unit 170. Chroma Decision Unit 170 employs signals NOTCH CHROMA 0, NOTCH CHROMA 1, NOTCH CHROMA 2, NOTCH CHROMA 3, NOTCH CHROMA 4 to generate a DECISION factor selection indicator at an output locus 172 for presentation to input locus 49 (FIG. 2).

Output loci 120, 124, 128, 132, 136 are presented as the NOTCH LUMA MATRIX input previously described as occurring at input locus 28 (FIG. 2).

Output loci 140, 142, 144, 146, 148 are provided to a decision apparatus 150. Decision apparatus 150 includes low pass filters 152, 154, 156, 158, 160 and a decision logic unit 162. Signal NOTCH LUMA 0 is provided to low pass filter 152 from output locus 120. Signal NOTCH LUMA 1 is provided to low pass filter 154 from output locus 124. Signal NOTCH LUMA 2 is provided to low pass filter 156 from output locus 128 Signal NOTCH LUMA 3 is provided to low pass filter 158 from output locus 132. Signal NOTCH LUMA 4 is provided to low pass filter 160 from output locus 136. Low pass filters 152, 154, 156, 158, 160 provide output signal to decision logic unit 162. Decision logic unit 162 generates a DECISION factor that is presented as previously described at input locus 49 (FIG. 2).

Figure 4:
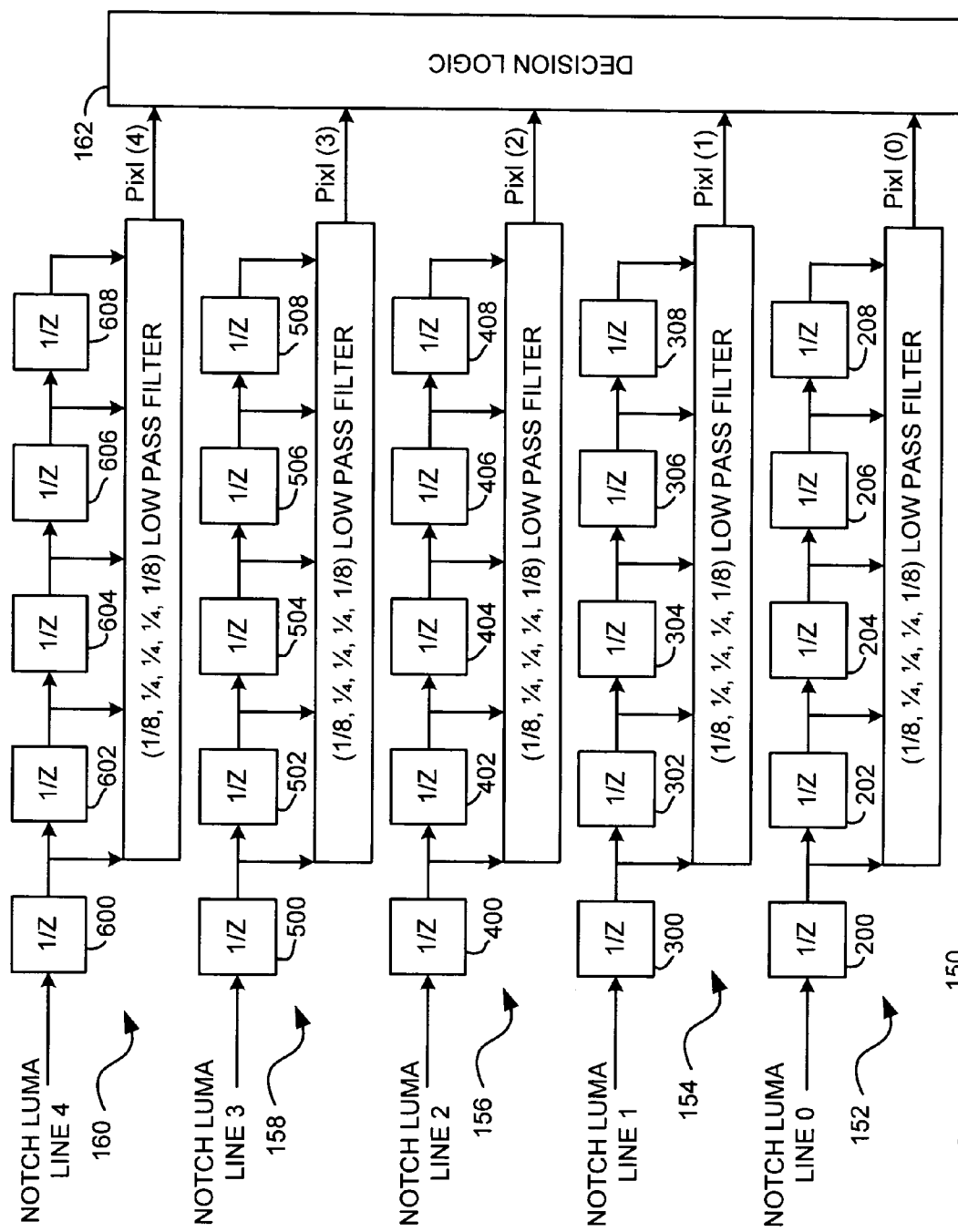
FIG. 4 is a schematic illustration of a decision apparatus for providing decision factors to the combining apparatus illustrated in FIG. 2.

FIG. 4 is a schematic illustration of a decision apparatus for providing decision factors to the combining apparatus illustrated in FIG. 2. In FIG. 4, decision apparatus 150 includes low pass filters 152, 154, 156, 158, 160 and decision logic unit 162. Low pass filters 152, 154, 156, 158, 160 are each embodied in a five tap FIR (Finite Impulse Response) filter with coefficients ($1/8$, $1/4$, $1/4$, $1/4$, $1/8$). Low pass filters 152, 154, 156, 158, 160 horizontally low pass filter NOTCH LUMA signals to further suppress data near the color sub carrier frequency (e.g., frequency $f_2$; FIG. 1). The further filtering is desired to suppress uncancelled CHROMA signal that has slipped through filtering by a bandpass filter 104, 106, 108, 110, 112 (FIG. 3). The output of a respective low pass filter 152, 154, 156, 158, 160 is a pixel represented by a respective NOTCH LUMA n signal (FIG. 3). The various pixels presented by low pass filters 152, 154, 156, 158, 160 are pixels that appear on an axis in the image represented by the signals LINE n (FIG. 3). In the preferred embodiment of the invention, the pixels presented by low pass filters 152, 154, 156, 158, 160 are pixels that appear on a vertical axis in the image represented by the signals LINE n (FIG. 3).

Low pass filter 152 receives the signal NOTCH LUMA 0 from output locus 120 (FIG. 3) and filters the signal NOTCH LUMA 0 using taps 200, 202, 204, 206, 208 applying coefficients ($1/8$, $1/4$, $1/4$, $1/4$, $1/8$) to present pixel (0) to decision logic 162. Low pass filter 152 receives the signal NOTCH LUMA 0 from output locus 120 (FIG. 3) and filters the signal NOTCH LUMA 0 using taps 200, 202, 204, 206, 208 applying coefficients ($1/8$, $1/4$, $1/4$, $1/4$, $1/8$) to present pixel (0) to decision logic 162. Low pass filter 154 receives the signal NOTCH LUMA 1 from output locus 124 (FIG. 3) and filters the signal NOTCH LUMA 1 using taps 300, 302, 304, 306, 308 applying coefficients ($1/8$, $1/4$, $1/4$, $1/4$, $1/8$) to present pixel (1) to decision logic 162. Low pass filter 156 receives the signal NOTCH LUMA 2 from output locus 128 (FIG. 3) and filters the signal NOTCH LUMA 2 using taps 400, 402, 404, 406, 408 applying coefficients ($1/8$, $1/4$, $1/4$, $1/4$, $1/8$) to present pixel (2) to decision logic 162. Low pass filter 158 receives the signal NOTCH LUMA 3 from output locus 132 (FIG. 3) and filters the signal NOTCH LUMA 3 using taps 500, 502, 504, 506, 508 applying coefficients ($1/8$, $1/4$, $1/4$, $1/4$, $1/8$) to present pixel (3) to decision logic 162. Low pass filter 160 receives the signal NOTCH LUMA 4 from output locus 136 (FIG. 3) and filters the signal NOTCH LUMA 4 using taps 600, 602, 604, 606, 608 applying coefficients ($1/8$, $1/4$, $1/4$, $1/4$, $1/8$) to present pixel (4) to decision logic 162.

Decision logic unit 162 determines differences among selected samples (i.e., pixels 0, 1, 2, 3, 4) of signals NOTCH LUMA n. By doing so in the preferred embodiment of the present invention illustrated herein, decision logic unit 162 is determining LBLdiff, that is, vertical differences among luminance in pixels Pixel (0), Pixel (1), Pixel (2), Pixel (3), Pixel (4) presented by low pass filters 152, 154, 156, 158, 160. An additional 6 dB attenuation to CHROMA may be obtained by combining adjacent line differences with a two-line difference. In the preferred embodiment of the present invention, the following differences are determined (for NTSC—U.S. Standards):

$$DiffV13 = \frac{|Pxl(2) - Pxl(0)|}{2} + \frac{|Pxl(2) - Pxl(1)|}{2} \quad [3]$$

$$DiffV35 = \frac{|Pxl(2) - Pxl(4)|}{2} + \frac{|Pxl(2) - Pxl(3)|}{2} \quad [4]$$

$$DiffV = \frac{|Pxl(1) - Pxl(3)|}{2} + \frac{DiffV13}{4} + \frac{DiffV35}{4} \quad [5]$$

The Above expressions are preferably somewhat different for PAL—European Standards:

$$DiffV13 = |Pxl(2) - Pxl(0)| \quad [6]$$

$$DiffV35 = |Pxl(2) - Pxl(4)| \quad [7]$$

$$DiffV = \frac{|Pxl(0) - Pxl(4)|}{2} + \frac{DiffV13}{4} + \frac{DiffV35}{4} \quad [8]$$

Certain CHROMA factors (not shown) are applied to comb filters 22, 24 (FIG. 2) to effect a comb filter decision logic to select from four filter modes by which comb filters 22, 24 will operate. A full vertical (V) mode causes comb filters 22, 24 to pass the full vertical pixel array, that is vertical samples from all five lines LINE 0, LINE 1, LINE 2, LINE 3, LINE 4. An early vertical (V13) mode causes comb filters 22, 24 to pass the upper half of the pixel arrays, that is, vertical samples from lines LINE 0, LINE 1, LINE 2. A late vertical (V35) mode causes comb filters 22, 24 to pass the lower half of the pixel arrays, that is, vertical samples from lines LINE 2, LINE 3, LINE 4. A Notch mode causes comb filters 22, 24 to operate substantially as a notch filter, performing no comb filter function.

It is DECISION factors DiffV13, DiffV35, DiffV that comprise the factor ΔL selected by weighting factor unit 46 (FIG. 2). Selection of which DECISION factor DiffV13, DiffV35, DiffV is to be applied as weighting factor ΔL by weighting factor unit 46 to weighting unit 42 (FIG. 2) is determined by which filter operating mode is in use. The choice of weighting factor ΔL is performed:

When in full vertical mode (V), ΔL=DiffV    [9]

When in upper half mode (V13), ΔL=DiffV 13    [10]

When in lower half mode (V35), ΔL=DiffV 35    [11]

When in Notch mode, ΔL=1    [12]

Thus, when operating in the Notch filter mode, weighing unit 42 (FIG. 2) does not effect any weighting and substantially passes on signals received at input locus 44 to output locus 52.

Further programmability and flexibility may be provided by modifying DL using a programmable gain and offset, such as by providing a $\Delta L_{FINAL}$ for weighting in weighting unit 42 (FIG. 2). By way of example and not by way of limitation, a $\Delta L_{FINAL}$ may be calculated as:

$$\Delta L_{FINAL} = (\Delta L + \Delta L_{OFFSET}) \cdot \Delta L_{GAIN} \quad [13]$$

Where $\Delta L_{OFFSET}$ is a programmable value; and
$\Delta L_{GAIN}$ is a programmable value.

Providing a system and method employing expression [13] allows a user to program the speed and switch point of bandwidth modulation. Higher $\Delta L_{GAIN}$ values will speed the reaction time of combining apparatus 20 (FIG. 2) to result in a shorter mixing region. The $\Delta L_{OFFSET}$ term can be used to create a hard error level that must be crossed before mixing begins by combining unit 20.

Figure 5:
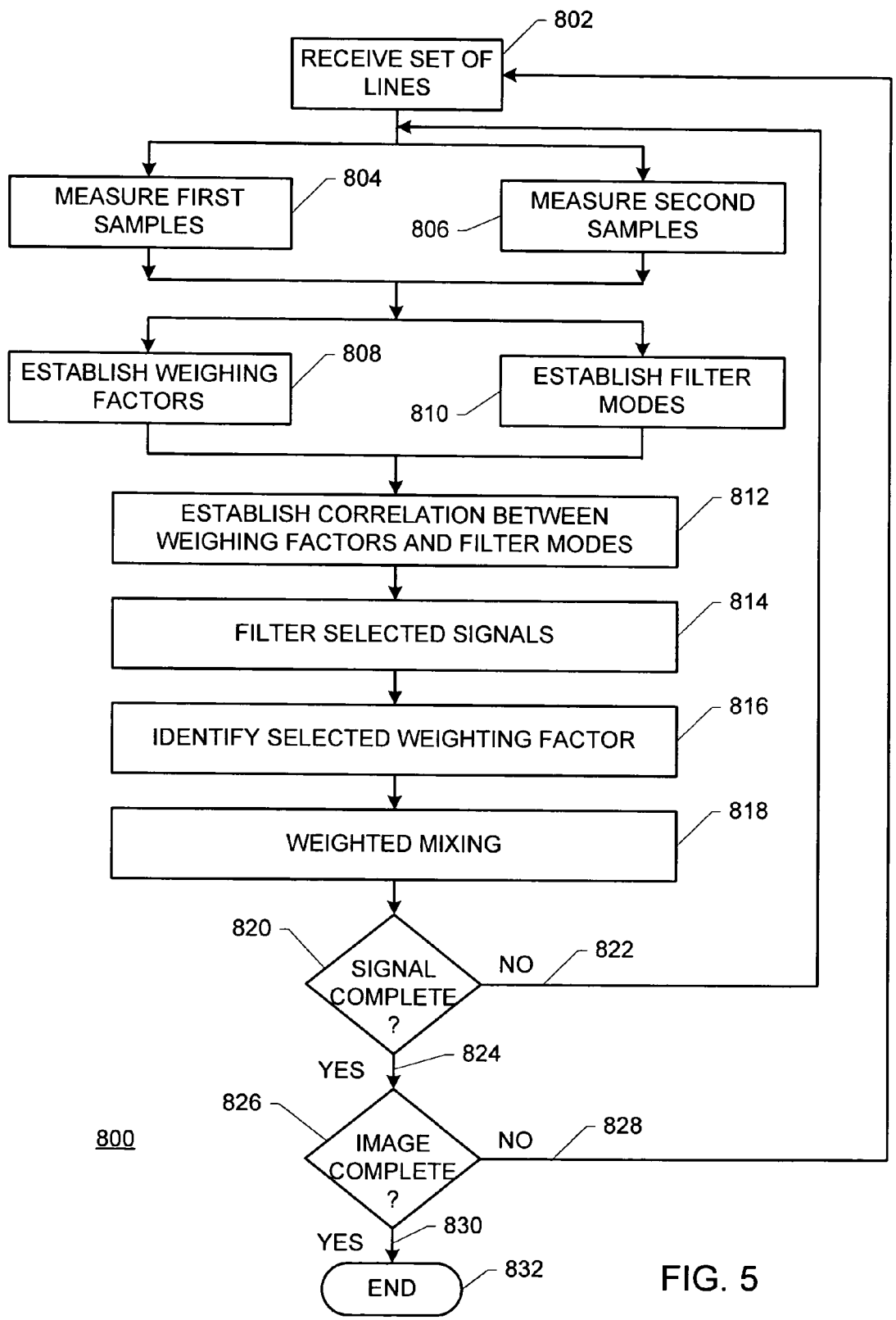
FIG. 5 is a flow chart illustrating the preferred embodiment of the present invention.

FIG. 5 is a flow chart illustrating the preferred embodiment of the present invention. In FIG. 5, a method 800 for generating a representation of a particular signal among a plurality of signals is illustrated. Each respective signal of the plurality of signals represents a respective line among a plurality of lines in an image. Each respective signal includes a first signal component and a second signal component. The first signal component represents luminance of the image and has a first bandwidth between a lower frequency and an upper frequency. The second signal component represents color content of the image and has a second bandwidth between a third frequency and a fourth frequency. The third frequency is greater than the lower frequency, and the fourth frequency is less than the upper frequency. Method 800 begins with the step of (a) receiving a set of n lines of the plurality of lines, as indicated b a block 802. The set of n lines includes the particular line.

Method 800 continues with the step of (b) in no particular order: (1) measuring a respective first sample of the first signal component of each respective line of the n lines, as indicated by a block 804; each respective first sample appearing along a predetermined axis in the image; and (2) measuring a respective second sample of the second signal component of each respective line, as indicated by a block 806.

Method 800 continues with the step of, (c) in no particular order: (1) establishing a plurality of weighting factors based upon sample differences between selected samples of the respective first samples, as indicated by a block 808; and (2) establishing a plurality of filter modes for selectively filtering the plurality of signals based upon the second samples, as indicated by a block 810.

Method 800 continues with the step of (d) establishing a correlation between the plurality of weighting factors and the plurality of filter modes, as indicated by a block 812. Method 800 continues with the step of (e) filtering the plurality of signals using a selected filter mode of the plurality of filter modes, as indicated by a bock 814. The selected filter mode is selected using the second samples. Method 800 continues with the step of (f) identifying a selected weighting factor of the plurality of weighting factors according to the correlation for the selected filter mode, as indicated by a block 816.

Method 800 continues with the step of (g) employing the selected weighting factor to effect weighted mixing of the samples to generate the representation of the particular signal for the particular time interval, as indicated by a block 818. Method 800 then poses a query whether the representation of the particular signal is complete, as indicated by query block 820. If representation of the particular signal is not complete, method 800 proceeds via NO response line 822 to return to step (b) to repeat steps represented by blocks 804, 806 and succeeding blocks in method 800. If representation of the particular signal is complete, method 800 proceeds via YES response line 824 to address another query whether representation of the image conveyed by the plurality of lines is complete, as indicated by a query block 826. If representation of the image is not complete, method 800 proceeds via NO response line 828 to return to step (a) to repeat steps represented by blocks 802 and succeeding blocks in method 800. If representation of the particular signal is complete, method 800 proceeds via YES response line 830. Method 800 terminates at an END locus 832.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A method for generating a representation of a particular signal among a plurality of received signals; each respective signal of said plurality of signals representing a respective line among a plurality of lines in a video display; each said respective signal including a first signal component and a second signal component; said first signal component having a first bandwidth between a first frequency and a second frequency; said second signal component having a second bandwidth between said first frequency and said second frequency; said second bandwidth being less than said first bandwidth; the method comprising the steps of:
   (a) in no particular order:
      (1) measuring first samples of said first signal component outside said second bandwidth for a particular time interval in each said respective signal to determine first sample differences between selected said first samples; and
      (2) measuring second samples of said second signal component inside said second bandwidth for said particular time interval in each said respective signal;
   (b) in no particular order:
      (1) establishing a plurality of weighting factors based upon said first sample differences; and
      (2) establishing a plurality of filter modes for selectively filtering said plurality of signals based upon said second samples;
   (c) establishing a correlation between said plurality of weighting factors and said plurality of filter modes;
   (d) filtering said plurality of signals using a selected filter mode of said plurality of filter modes; said selected filter mode being selected using said second samples;
   (e) identifying a selected weighting factor of said plurality of weighting factors according to said correlation for said selected filter mode;
   (f) employing said selected weighting factor to effect weighted mixing of said samples to generate said representation of said particular signal for said particular time interval; and
   (g) repeating steps (a) through (f) until representation of said particular signal is completed.

2. A method for generating a representation of a particular signal among a plurality of received signals as recited in claim 1 wherein the method comprises the further steps of:
   (h) when representation of said particular signal is completed, selecting another plurality of signals in said video display; and
   (i) repeating steps (a) through (h) until representation of said video display is complete.

3. A method for generating a representation of a particular signal among a plurality of received signals as recited in claim 2 wherein said first signal component represents luminance of said respective signal and said second signal component represents color content of said respective signal.

4. A method for generating a representation of a particular signal among a plurality of received signals as recited in claim 2 wherein said plurality of lines is five lines.

5. A method for generating a representation of a particular signal among a plurality of received signals as recited in claim 1 wherein said first signal component represents luminance of said respective signal and said second signal component represents color content of said respective signal.

6. A method for generating a representation of a particular signal among a plurality of received signals as recited in claim 1 wherein said plurality of lines is five lines.

7. A method for generating a representation of a particular signal among a plurality of signals; each respective signal of said plurality of signals representing a respective line among a plurality of lines in an image; each said respective signal including a first signal component and a second signal component; said first signal component representing luminance of said image and having a first bandwidth between a lower frequency and an upper second frequency; said second signal component representing color content of said image and having a second bandwidth between a third frequency and a fourth frequency; said third frequency being greater than said lower frequency; said fourth frequency being less than said upper frequency; the method comprising the steps of:
   (a) receiving a set of n lines of said plurality of lines; said set of n lines including said particular line;
   (b) in no particular order:
      (1) measuring a respective first sample of said first signal component of each respective line of said n lines; each said respective first sample appearing along a predetermined axis in said image; and
      (2) measuring a respective second sample of said second signal component of each said respective line;
   (c) in no particular order:
      (1) establishing a plurality of weighting factors based upon sample differences between selected samples of said respective first samples; and
      (2) establishing a plurality of filter modes for selectively filtering said plurality of signals based upon said second samples;
   (d) establishing a correlation between said plurality of weighting factors and said plurality of filter modes;
   (e) filtering said plurality of signals using a selected filter mode of said plurality of filter modes; said selected filter mode being selected using said second samples;
   (f) identifying a selected weighting factor of said plurality of weighting factors according to said correlation for said selected filter mode;
   (g) employing said selected weighting factor to effect weighted mixing of said samples to generate said representation of said particular signal for said particular time interval; and
   (h) repeating steps (a) through (g) until representation of said particular signal is completed.

8. A method for generating a representation of a particular signal among a plurality of signals as recited in claim 7 wherein the method comprises the further steps of:
   (i) when representation of said particular signal is completed, receiving a new set of n lines of said plurality of lines; said new set of n lines including a new particular line; and
   (j) repeating steps (a) through (i) until representation of said image is complete.

9. A method for generating a representation of a particular signal among a plurality of signals as recited in claim 8 wherein n is five.

10. A method for generating a representation of a particular signal among a plurality of signals as recited in claim 8 wherein said predetermined axis is a vertical axis.

11. A method for generating a representation of a particular signal among a plurality of signals as recited in claim 7 wherein n is five.

12. A method for generating a representation of a particular signal among a plurality of signals as recited in claim 7 wherein said predetermined axis is a vertical axis.

* * * * *